United States Patent Office 3,474,920
Patented Oct. 28, 1969

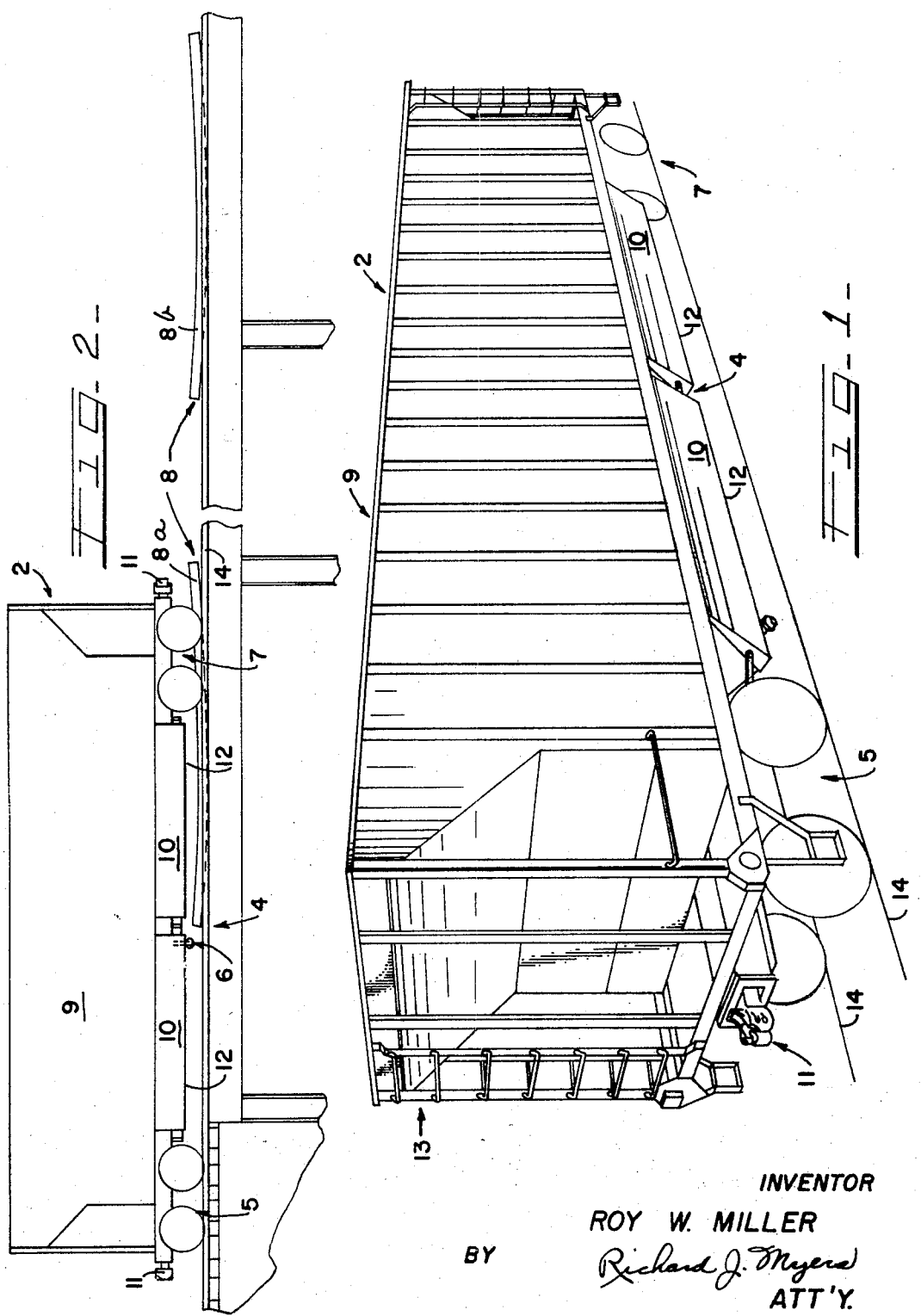

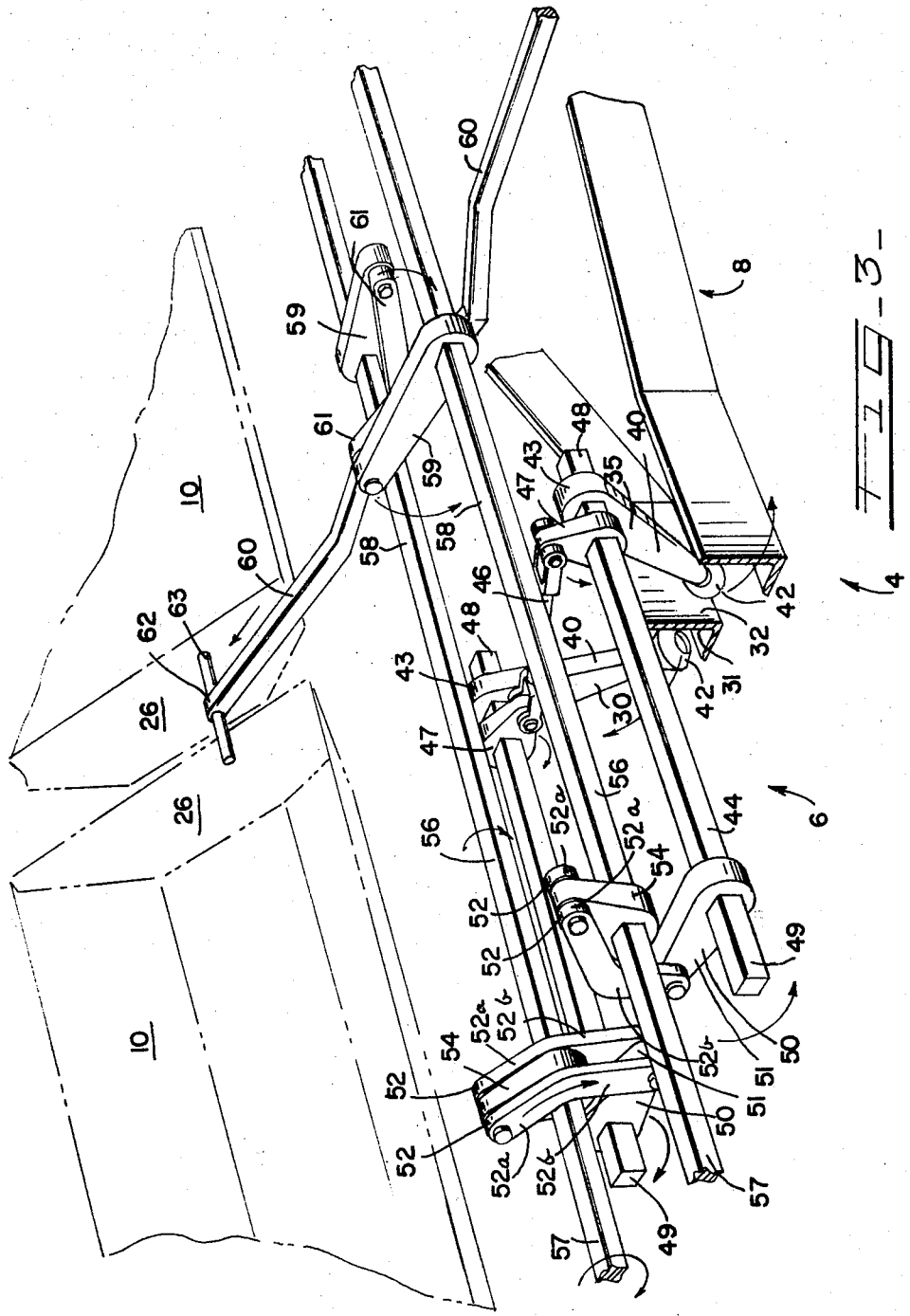

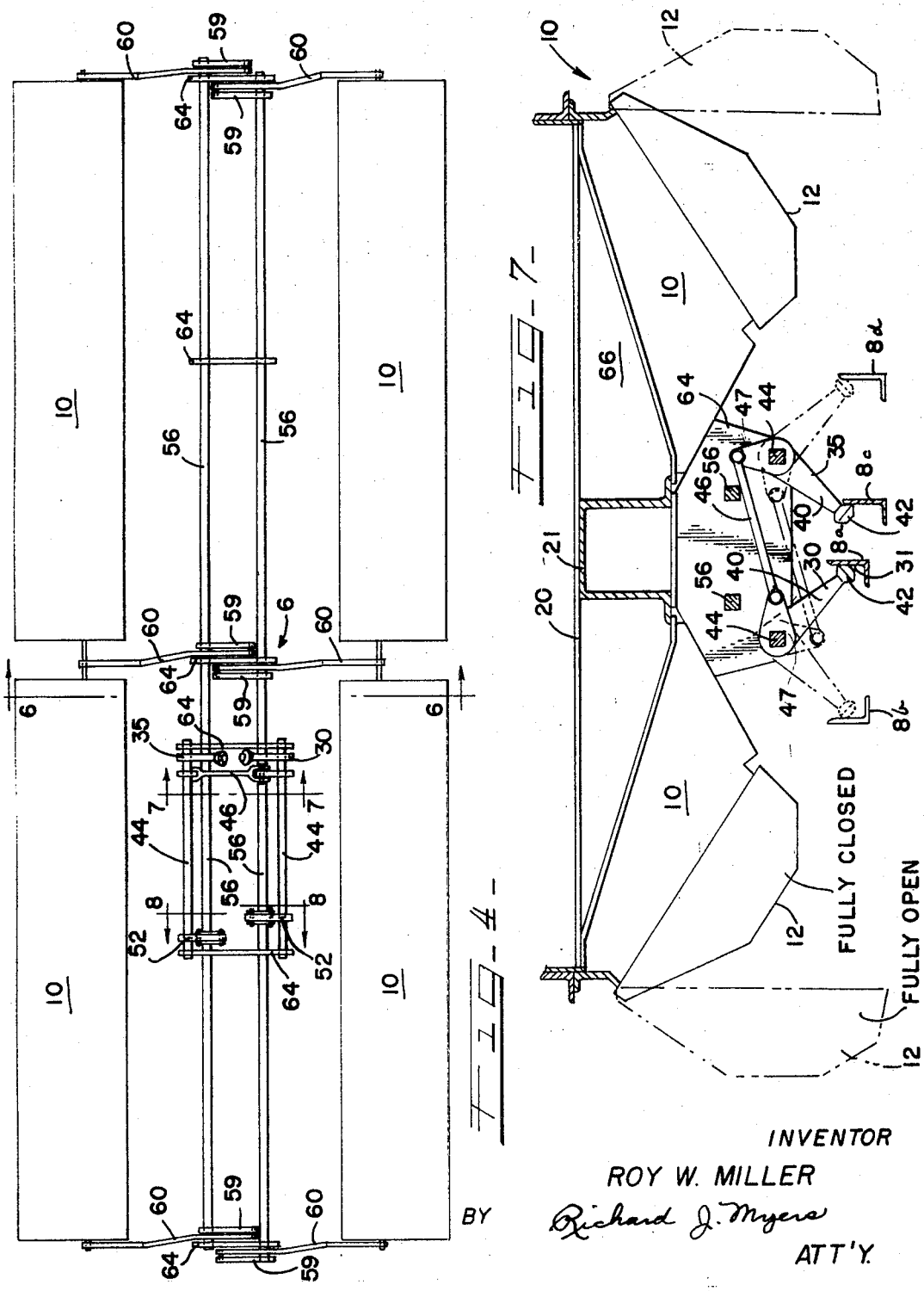

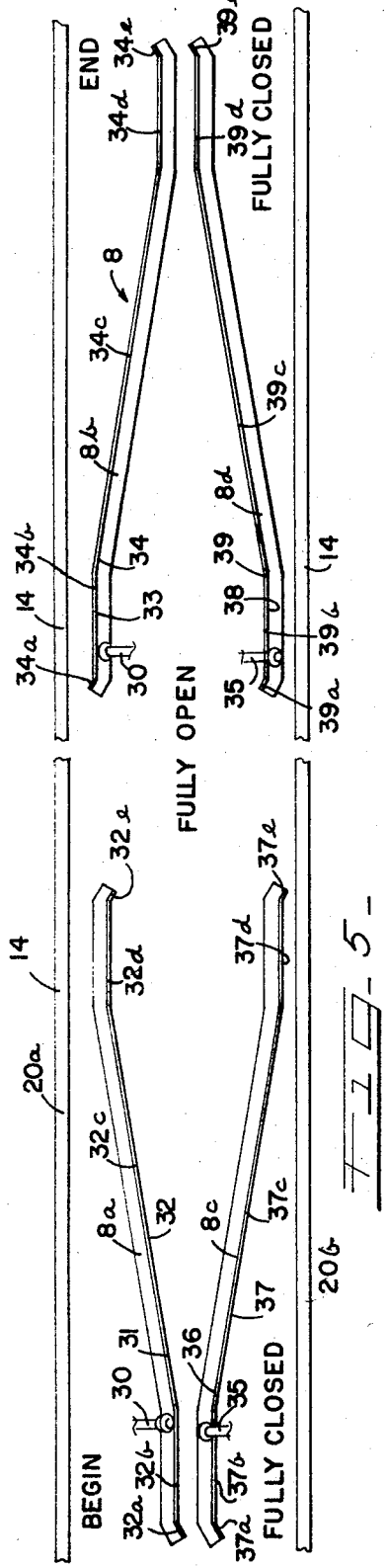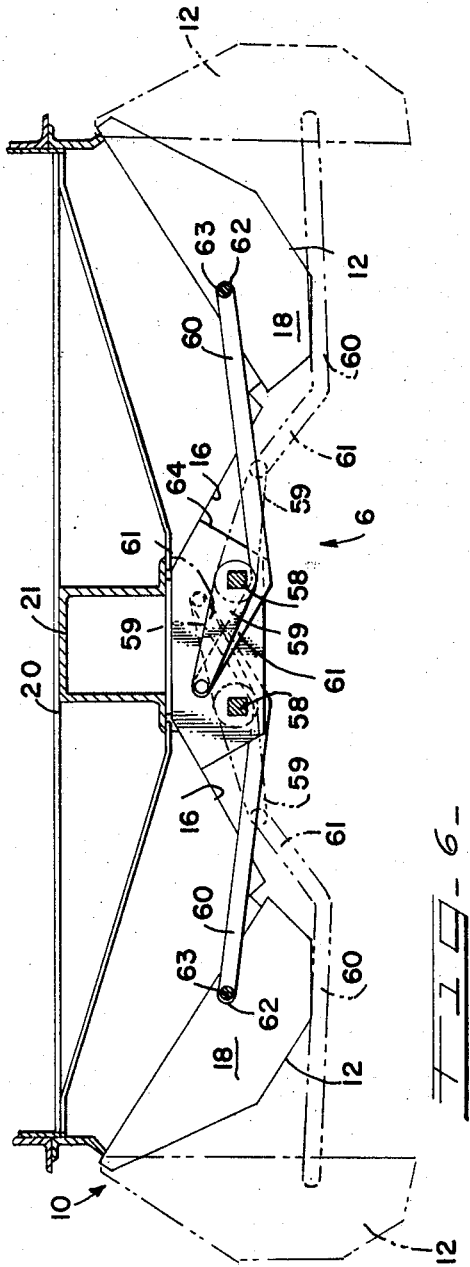

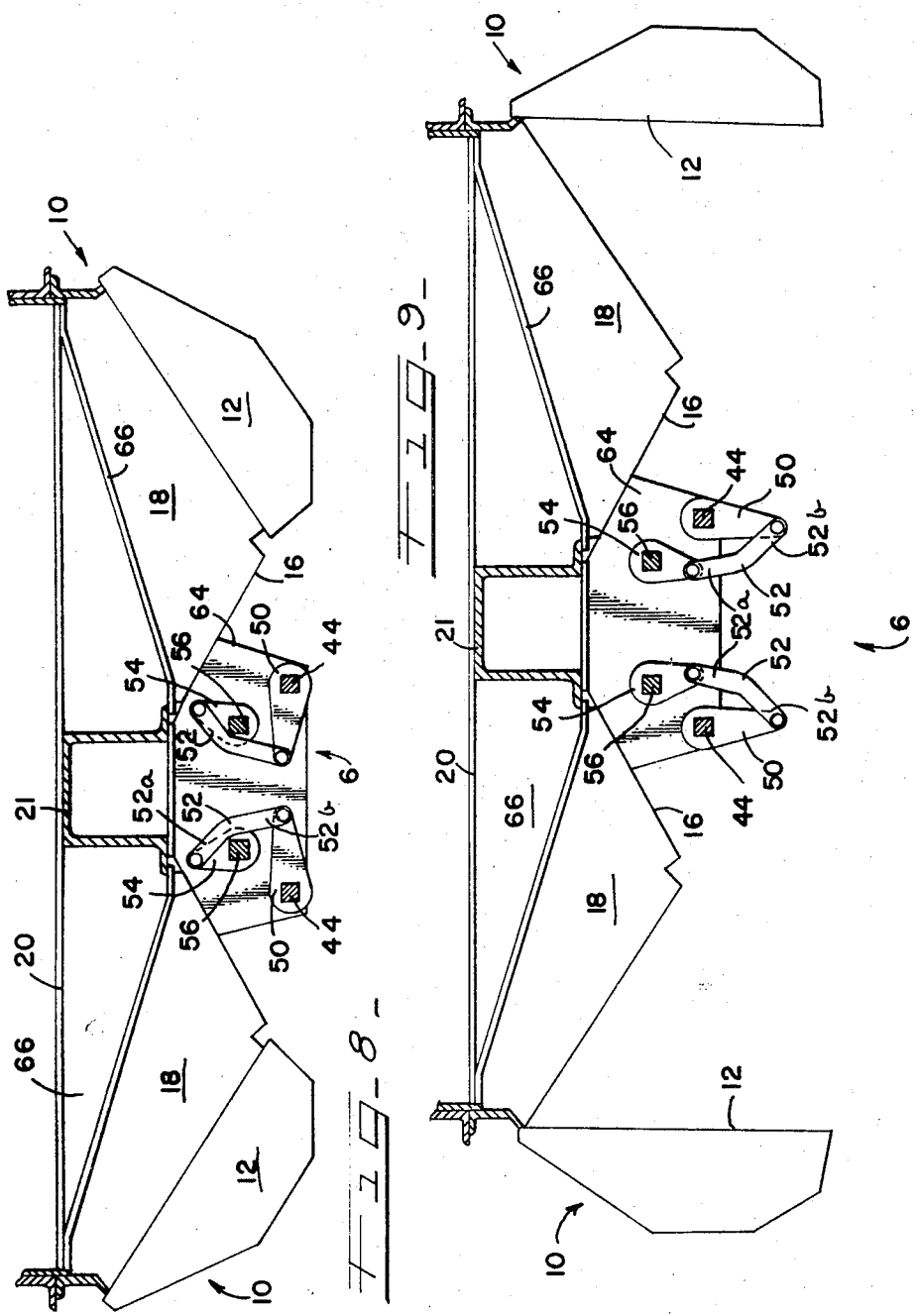

3,474,920
OPERATING MECHANISM FOR A VEHICLE DISCHARGE MEANS
Roy W. Miller, Highland, Ind., assignor to Pullman Incorporated, Chicago, Ill., a corporation of Delaware
Filed Dec. 12, 1966, Ser. No. 600,994
Int. Cl. B61d 7/02; B60p 1/56
U.S. Cl. 214—63                               26 Claims

ABSTRACT OF THE DISCLOSURE

This invention relates to operating mechanism for opening and closing the hopper doors of a car operating along a road bed at a dumping site wherein the door opening mechanism is controlled by between-the-tracks underneath car right-of-way actuating track or rail located at the dumping or discharge site where the material or lading is discharged into roadside or railside storage areas, usually below ground level. The particular arrangement herein disclosed provides for a drive lever that engages such an actuating track whereby the lever rotates longitudinally extending force transmitting rods underneath the rail car which in turn operate suitable levers whereby the angular motion imparted to an upper located pair of force transmitting members is multiplied in order to fully open or close the doors. The door operating mechanism will operate regardless which end of the car enters the dumping or unloading site, and may enter dumping site from either end.

BACKGROUND OF INVENTION

Field of the invention

This invention relates to operating mechanism for vehicle discharge means and, more in particular, relates to mechanism required to open the doors of the side discharge type hopper railroad car whereby the load or lading, such as coal, may be discharged from the side of the railroad car into the rail bed side below-car lading storage pit as it passes along a certain point of the railroad track over which it traverses. The hopper car door mechanism of the invention comprehends an unloading system that is a mechanical device, utilizing linkage powered by an off-track engaging device and the train motion.

Description of the prior art

The prior art has been developed to the state where it provides for track actuated discharging of loads or lading from a hopper type railroad car but the operation of such discharge of lading has not been wholly satisfactory in providing effective wholly automatic discharge of the lading. Further, cumbersome structure has been utilized on the car to allow sufficient amount of opening of the hopper doors. What is needed is a fully automatic discharging mechanism with a lever system to allow a sufficient amount of opening of the hopper mechanism within the limited space of the hopper car area.

SUMMARY

This invention provides for a fully automatic door operating mechanism which is operated by a simplified actuating rail located beneath the car and on the road or between the rails over which the car passes. The invention provides for a unique lever system which requires a minimum of storage space and yet provides a maximum amount of force transmission to open the doors of the hopper. Further, by the invention structure is provided to permit the actuating rail engaging lever system to rotate in transverse planes to car movement that are parallel to planes in which the door operating links move and therefore there is a simplified effective transmission of forces to the door mechanism. Furthermore there is provided as between the initiating lever of the operating mechanism and the final door operating or opening rod a unique lever system which through multiplication of lever arms permits increased angular movement of the door so that the doors may have a maximum opening for maximum dumping of the lading in a given amount of time and space as the car passes by the dumping site. These and other purposes, advantages and objects of the invention will become apparent from the following description.

DESCRIPTION OF DRAWINGS

FIG. 1 is a perspective view of the vehicle such as a railroad hopper car employing the novel invention;

FIG. 2 is a schematic view of the railroad car employing the novel door operating mechanism traversing over the actuating rail or mechanism located between the railroad tracks;

FIG. 3 is an enlarged partial perspective view of the door operating mechanism and actuating rail therefor;

FIG. 4 is a plan view as seen from below the vehicle of the door operating mechanism and its connection with the hopper dors;

FIG. 5 is a plan view as seen from above of the actuating rail disposed between the rails of the railroad or on the road;

FIG. 6 is a section taken along line 6—6 of FIG. 4;

FIG. 7 is a sectional view taken along line 7—7 of FIG. 4;

FIG. 8 is a sectional view taken along line 8—8 of FIG. 4; and

FIG. 9 is a view similar to FIG. 8 but with the doors in the open position instead of in the closed position.

DESCRIPTION OF THE PREFERRED EMBODIMENT

With reference now to the drawings there is shown, in FIG. 1, a vehicle, such as a railroad car 2, employing the novel invention disclosed herein in the form of the door operating mechanism 4 which includes the door operating linkage or structure 6 and the actuating rail means 8 as seen in FIGS. 1, 2 and 5. It is to be noted that the car is provided with side discharge hoppers 10 for discharging the lading or bulk material within each hopper into off-the-track or along the side of the track discharge pits. This is noted for instance in FIG. 4 where there are shown four hoppers 10, two hoppers being laterally spaced from two others along the longitudinal axis of the car. The side discharge hopper car 2 may carry coal or the like and is provided with the usual trucks 5 and 7 which carry the car body 9 provided with coupling means 11 and ladder 13 and the underneath hopper means 10. As seen in FIG. 1, 5, 6, 7, 8 or 9 the hopper body or unit 10 is generally V-shaped in cross-section and is of the side discharge type in that it is provided with a longitudinally extending laterally disposed underside sloping hopper door 12 which in the open position, as for instance shown in FIG. 9, permits any lading, such as coal, to be discharged laterally of or out of the side of the car and somewhat outwardly of the rail track over which the car traverses, for instance outwardly of the track 14 as shown in FIG. 1, 2 or 5, the track consisting of two parallel rails 20a and 20b respectively. Each hopper 10, in addition to having a laterally outwardly opening door 12, has an inwardly longitudinally extending side 16 to form with the door 12 the V shaped hopper unit 10, having the usual end walls 18, the doors 12 depending from the body structure 20 including the center sill 21 as for instance shown in FIGS. 6, 8 and 9.

As the coal car traverse along the track 14 it encounters the door actuating mechanism or triggering mechanism 8 in the form of right-of-way structure positioned between the rails 20a and 20b, generally indicated as the right-of-way or door tripping mechanism 8 as shown in FIG. 2, 3 or 5, which mechanism 8 in turn operates the door operating or actuating lever linkage mechanism 6 located on the car itself as distinguished from the mechanism or cam track means 8 which is located on the railroad bed. When engagement occurs between the structures 6 and 8 during car movement, each door structure 12 is caused to be opened and later to be closed. The actuating or right-of-way structure 8 for the doors comprises a door opening track or guide unit 8a and longitudinally spaced therefrom a door closing track or guide unit 8b. The drive lever 30 of the door operating linkage mechanism 6 engages the outside vertical surface 31 of the right track wall 32 of the track unit 8a in initiating the door opening operation. It is noted that this vertical wall 32 diverges outwardly toward the track 20a to a point where it becomes parallel to the track 20a for a short distance at which point the door 12 of each of the units is fully opened. The lever 30 continues to travel along the railroad track 20a until it reaches track 8b where it engages the inner surface 33 of the vertical wall 34 of the track unit 8b, the track wall being generally first parallel to the track sections 20a and 20b and then diverging away from the track 20a toward the track 20b and then becoming parallel for a short length at which point the door is once again fully closed. At this point the end of dumping operation has been reached. It is thus seen that the vertical wall 32 of the track section 8a is divided into portions, namely, portions 32a, 32b, 32c, 32d and 32e; whereas track wall 34 of track section 8b is similarly divided into track wall portions 34a, 34b, 34c, 34d and 34e. If the vehicle or car 2 enters the dumping area from the opposite direction then the drive lever 35 would engage a track section 8d to open the door and then a longitudinally spaced therefrom track 8c for closing the door. Under such a condition the drive lever 35 would first engage the outside wall surface 38 of the vertical wall 39 of the section 8d and then it would engage the inside vertical surface 36 of the vertical wall 37 of the track unit 8c. Like track sections 8a and 8b, track sections 8c and 8d have corresponding track portions 37a, 37b, 37c, 37d and 37e; and portions 39a, 39b, 39c, 39d and 39e, respectively. Track portions 8a and 8c are generally mirror images of one another except for their beginning and terminating portions which are reverse mirror images of each other and a similar relation exists between track sections 8b and 8d. Referring now to FIG. 7 it is seen that either the lever 30 or the lever 35 is rotated about a horizontal axis 90 degrees to the left or clockwise in the case of lever 30 and to the right or counterclockwise in the case of lever 35. It is this angular movement of the chosen lever 30 or 35 that causes opening and then subsequently closing of the hopper doors 12 as the chosen lever 30 or 35 moves along its respective track sections 8a, 8b or 8c, 8d from the begin position as shown in FIG. 5 where the hopper doors are fully closed to the fully opened position of the hopper doors at which point the lading is dumped into roadside or railside storage pits and then to the fully closed position of the doors 12 where dumping is completely terminated. Transference of movement of the lever 30 or 35 along the meandering or undulating track means 8 which results in opening and closing of the doors 12 is accomplished by the linkage arrangement of the door actuating mechanism 6 that is located on the vehicle 2 hereafter to be described.

The mechanical door operating mechanism 6 that is actuated by the actuating mechanism or right-of-way structure 8, as seen in FIGS. 3 and 4 and 6 through 9, comprises the force actuating bar or drive lever means 30 or 35 which comprises a downwardly tapered link or arm 40 having at its lower end a round knob 42 for engagement with one of the track elements and at its upper end 43 wider portion which is fixedly attached to the force transmitting member 44. An interconnecting link 46 connects each force transmitting member 44 of each lever 30 or 35 with one another for transmission to the car doors regardless of which way the car is located or facing on the railroad tracks. The drive lever 30 or 35 which is not engaging a particular track and is idle merely rotates because of the connecting link 46. The connecting link 46 is pivotally attached at each of its ends to arms 47, 47 respectively which are each fixedly connected to the force transmitting means or members 44 respectively, at their ends 48, 48. The other end 49 of each lower force transmitting member 44 runs longitudinally of the car and fixedly connects with further arms 50, 50, the inner ends 51, 51 of which are pivotally connected to the respective angle arms 52, 52 each of which is slightly boomerang shaped or is slightly bent to form two arm parts, short arm 52a and long arm 52b, the short arm 52a being pivotally connected at its upper end to throw arm 54 at one end thereof and at the lower end thereof being rigidly attached to an upper force transmitting rod 56 at its end 57. Each upper force transmitting member 56 at its part 58 couples with a lever arm 59 rigidly at one end thereof, and at the other end of arm 59 the door actuating or operating rod 60 has its end 61 connected thereto, and the other end 62 of each door actuating rod 60 is connected to pin 63 which couples to a pair of doors 12 for opening of said doors by movement of the door opening rod 60 in the direction shown by the arrows in FIG. 3. Rotation of the upper force transmitting members 56 occurs in the direction shown by the arrow because of the movement of the lower force transmitting members 44 as moved by the drive lever 35 or 30 as shown in FIG. 3. The force transmitting members 44, 44 and 56, 56 are mounted by support structure 64 from the center sill structure 21 carried by cross member 66 as shown in FIGS. 8 and 9. As shown in FIG. 4 the upper force transmitting members 56 may connect to a plurality of door operating rods 60. When the lower force transmitting rods 44 transfer their movement by way of the links 52 to the upper force transmitting members 56 the angular movement of the upper force transmitting rods is multiplied by a two to one ratio, for example, so that the doors 12 instead of opening 30 degrees may open 60 degrees for example. It is thus seen that there is provided a novel dual set of force transmitting members running longitudinally of the car beneath and adjacent to the respective car hoppers which are coupled with suitable linkage connected to a drive lever operated by engagement with a between-the-track and underneath-the-car rail element which serve to open the hopper doors in the vicinity of the lading dumping area. The closed position of the doors is shown in FIG. 8 and the open position of the doors is shown in FIG. 9 which illustrates that the doors can be opened fully by the multiplying effect between the upper and lower force transmitting members. It will be noted that the force transmitting members are rotatively journaled in the supporting structure 64. Further, it is seen in FIG. 6 that the dotted line position shows the fully opened position of the doors whereas the solid line position shows the fully closed position of the doors 12. The same may be said for FIG. 7.

The foregoing description and drawings are given merely to explain and illustrate the invention, and the invention is not to be limited thereto, except insofar as the appended claims are so limited, as those skilled in the art who have the disclosure before them will be able to make modifications and variations therein without departing from the scope of the invention.

What is claimed is:

1. Door opening mechanism for a vehicle discharge means having laterally opening doors for discharging a load laterally outward of the vehicle, comprising:
    a door opening crank mechanism having a rail engaging drive lever means disposed on the vehicle,
    first force transmitting means having operative connection with said drive lever means,
    second force transmitting means removed in spaced relation from the first force transmitting means, and
    door operating means for connecting the doors with the second force transmitting means, and
    means interconnecting said first force transmitting means with said second force transmitting means whereby the motion delivered through the movement of the said drive lever means is multiplied in its transmission from said first force transmitting means to said second force transmitting means, said means interconnecting each of the force transmitting means comprising link means having a connection with the first force transmitting means at a distance greater than the connection of the link means with the second force transmitting means to multiply the angular movement of the second force transmitting means relative to the first force transmitting means to multiply the angular movement of the door operating means relative to the angular movement of the door opening rail engaging drive lever means.

2. The invention according to claim 1 and each of said force transmitting means comprising:
    a pair of force transmitting members disposed in laterally opposed relation to one another.

3. The invention according to claim 2, and
    said link means being constrained for arcuate movement with said second pair of force transmitting members and transmitting arcuate movement to said doors for opening the same in an arcuate path from a closed position to an opened position.

4. The invention according to claim 2, and
    said first pair of force transmitting members each carrying a force transmitting arm constrained for movement therewith, and
    said link means interconnecting each arm of each force transmitting member of the first pair for transference of forces between each of the first pair of the force transmitting members, the distance between the link means connection with the arms of said second force transmitting means being lesser than the distance between the connection of the link means with the arms of the first force transmitting means.

5. The invention according to claim 2, and
    said drive lever means comprising a number of drive levers one for each force transmitting member of the first pair,
    each drive lever being adapted for engagement with an associated between-the-tracks rail providing for operation of opening and closing said doors upon entrance of either end of said car into the lading dumping area and also approach the dumping site from the opposite direction.

6. The invention according to claim 2, and
    said link means for multiplying the amount of movement of the second pair of force transmitting members relative to the first pair of force transmitting members comprising a first arm fixedly connected with a respective force transmitting member of the first pair,
    a second arm pivotally connected with a respective first arm,
    a third arm pivotally connected to the respective second arm and fixedly attached to a respective force transmitting member of the second pair whereby motion is transmitted from a respective first force transmitting member to a respective second force transmitting member in a multiplying effect,
    said first arm being longer than said third arm.

7. The invention according to claim 2, and
    said force transmitting members of each pair extending longitudinally of said vehicle, and
    said lever means being connected with said first pair for rotating said first and second pairs of force transmitting members about their respective horizontally extending axes whereby said door operating means are moved in vertical transverse plane to the said horizontal axes of the first and second pair of force transmitting members.

8. The invention according to claim 2, and
    each of said pairs of force transmitting members being provided with throw arms for interconnecting said lever means with said door operating means and whereby through the pivotal movement of said throw arms said doors are opened and closed.

9. The invention according to claim 1, and
    each said force transmitting means extending longitudinally of the car with one of said force transmitting means being spaced above the other of said force transmitting means, and
    said link means for multiplying said motion extending vertically between and connecting with each of the force transmitting means.

10. The invention according to claim 1, and
    said first force transmitting means being spaced below and outwardly from said second force transmitting means.

11. The invention according to claim 1 wherein said link means interconnecting each of said force transmitting means comprises an angulated link for pivotally connecting each force transmitting means.

12. The invention according to claim 1, and
    said drive lever means and said force transmitting means being suspended underneath and from the center sill structure of the vehicle.

13. The invention according to claim 1, and
    right-of-way actuating rail means comprising a first door opening rail for engagement with the drive lever means to move the door from the closed to the open position, and
    a second door opening rail spaced longitudinally from said first door opening rail for engagement with the drive lever means to move the door from the open to the closed position,
    each of said rails having a vertical surface adapted for engagement with said drive lever means, each vertical surface coursing longitudinally and laterally attendant to opening and closing the vehicle doors.

14. The invention according to claim 13, and
    a third door opening rail being spaced laterally of said first door opening rail and adapted for engagement with said drive lever means when the end of the vehicle is facing in the opposite direction for fully opening said vehicle door, and
    a fourth door closing rail laterally opposing said second door closing rail and adapted to cooperate with said drive lever means for fully closing said door when the vehicle end is facing in the opposite direction,
    each of said third and fourth rails having a vertical surface adapted for engagement with said drive lever means, each vertical surface coursing longitudinally and laterally attendant to opening and closing the vehicle doors whereby the vehicle may approach the dumping site from either direction.

15. The invention according to claim 1, and
    right of way actuating rail means being disposed beneath the vehicle for applying a rotary motion in a vertical plane to the lever means as the vehicle moves over the discharging area whereby the lever means imparts vertical and horizontal motion to the door opening means in a transverse plane to the horizontal longitudinal axis of the vehicle for opening and closing the doors to the vehicle.

16. The invention according to claim 1, and said force transmitting members rotating about the longitudinally horizontally extending axis and said drive lever means rotating in vertical plane and said door operating means operating in vertical and horizontal direction in transverse vertical plane to the horizontal longitudinal axis of the vehicle.

17. The invention according to claim 1, and
said drive lever means having a throw arm connection with said force-transmitting means for operating each of said door operating means in vertical laterally extending plane attendant to opening and closing each of said doors.

18. The invention according to claim 1, and
said lever means comprising a drive lever, the lower end of which is provided with rail engaging means and the upper end of which is mounted with the first force transmitting means for arcuate movement thereabout in a vertical plane transverse to the longitudinal axis of the vehicle.

19. The invention according to claim 1, and
each door operating means comprising a transverse extending link and an arm coupled at one end with the link and at the other end coupled with the second force transmitting means for movement thereabout in a vertical transverse plane,
said second force transmitting means rotating about a generally horizontal, longitudinally extending axis.

20. The invention according to claim 1, and
said drive lever means comprising a dependent lever, the lower end of which is provided with rail-engaging means and the upper end of which is mounted with the force-transmitting means for arcuate movement thereabout in a vertical plane transverse to the longitudinal axis of the car,
each door operating means comprising a transversely extending link and an arm coupled at one end with the link and at the other end with the force-transmitting means for movement thereabout in a vertical transverse plane,
the force-transmitting means rotating about a generally horizontally extending longitudinal axis.

21. The invention according to claim 1, and
said drive lever means being rotatable in a vertical plane by the rail means as said drive lever means moves laterally longitudinally along the rail means.

22. The invention according to claim 1, and
said distance between said first force transmitting means and said means interconnecting being twice as great as the distance between said second force transmitting means and said means interconnecting whereby the angular movement of the door operating means is twice as great as the angular movement of the door opening rail engaging drive lever means.

23. Door opening mechanism for a vehicle discharge means having laterally opening doors for discharging a load laterally outward of the vehicle, comprising:
a door opening crank mechanism having a rail engaging drive lever means disposed on the vehicle,
first force transmitting means having operative connection with said drive lever means,
second force transmitting means removed in spaced relation from the first force transmitting means, and
door operating means for connecting the doors with the second force transmitting means, and
means interconnecting said first force transmitting means with second force transmitting means whereby the motion delivered through the movement of the said drive lever means is multiplied in its transmission from said first force transmitting means to said second force transmitting means,
road mounted rail means adapted for operative engagement of said lever means, said rail means comprising a pair of longitudinally spaced angulated leading and trailing rail units each having a vertical face defining an elongated meandering path along with the lever means for opening of the vertical discharge doors,
the surface of the leading rail unit being in opposed generally inverted position with respect to the surface of the trailing rail unit and having its surface in laterally opposed position with respect to the surface of the trailing rail unit.

24. Door opening mechanism for a vehicle discharge means having laterally opening doors for discharging a load laterally outward of the vehicle, comprising:
a door opening crank mechanism having a rail engaging drive lever means disposed on the vehicle,
first force transmitting means having operative connection with said drive lever means,
second force transmitting means removed in spaced relation from the first force transmitting means, and
door operating means for connecting the doors with the second force transmitting means, and
means interconnecting said first force transmitting means with said second force transmitting means whereby the motion delivered through the movement of the said drive lever means is multiplied in its transmission from said first force transmitting means to said second force transmitting means,
road mounted rail means adapted for operative engagement of said lever means, said rail means comprising a pair of longitudinally spaced angulated leading and trailing rail units each having a vertical face defining an elongated meandering path along with the lever means for opening of the vertical discharge doors,
the surface of the leading rail unit being in opposed generally inverted position with respect to the surface of the trailing rail unit and having its surface in laterally opposed position with respect to the surface of the trailing rail unit, and said lever means having a pair of drive levers,
each rail unit of the leading and trailing rail units comprising a pair of laterally spaced apart rails one generally diverging from the other and operative to engage the other of two drive levers to permit operation of the car doors regardless of which end of the rail car enters the dumping area or which end of the dumping site is entered.

25. Door opening mechanism for a vehicle discharge means having laterally opening doors discharging a load laterally outwardly of the vehicle comprising:
a door opening crank mechanism having a rail engaging drive lever means disposed on the vehicle,
force transmitting means having an operative connection with said drive lever means,
door operating means for connecting the doors with the force transmitting means, right-of-way actuating rail means comprising:
a first door opening meandering rail extending longitudinally and laterally outwardly for engagement with the drive lever means to move the door from the closed to the fully open position, and
a second door closing meandering rail extending longitudinally and laterally outwardly spaced longitudinally from said first door opening rail for moving said door from the fully opened position to the fully closed position, each of said rails having a generally vertical surface adapted for engagement with said drive lever means, said vertical surface coursing longitudinally and laterally and generally horizontally to operate and close the vehicle doors and extending in generally horizontal planes only for swinging the drive lever means in a vertical plane.

26. The invention according to claim 25, and
a third door opening rail being spaced laterally of said second door opening rail and adapted for engagement with said drive lever means when the end of the vehicle approaches from the opposite direction for opening said vehicle door, and a fourth door closing rail laterally opposing said first door closing rail and adapted to cooperate with said drive lever means for closing said door when the vehicle end approaches from the opposite direction, each of said third and fourth rails having a vertical surface adapted for engagement with said drive lever means, said vertical surface coursing longitudinally and laterally to open and close the vehicle door.

References Cited

UNITED STATES PATENTS

| | | | |
|---|---|---|---|
| 726,541 | 4/1903 | Kiesel | 105—255 |
| 1,266,630 | 5/1918 | Ross et al. | 214—63 |
| 1,594,863 | 8/1926 | Warner. | |

FOREIGN PATENTS

| | | |
|---|---|---|
| 5,251 | 10/1907 | Great Britain. |
| 711,444 | 6/1931 | France. |
| 192,964 | 2/1923 | Great Britain. |

GERALD M. FORLENZA, Primary Examiner

FRANK E. WERNER, Assistant Examiner

U.S. Cl. X.R.

105—251, 255, 304